(12) United States Patent
Mathieu

(10) Patent No.: US 8,382,349 B2
(45) Date of Patent: Feb. 26, 2013

(54) SIGNALING ASSEMBLY

(75) Inventor: Daniel J. Mathieu, Sheboygan Falls, WI (US)

(73) Assignee: K.W. Muth Company, Sheboygan, WI (US)

( * ) Notice: Subject to any disclaimer, the term of this patent is extended or adjusted under 35 U.S.C. 154(b) by 0 days.

(21) Appl. No.: 11/493,498

(22) Filed: Jul. 25, 2006

(65) Prior Publication Data
US 2008/0025034 A1 Jan. 31, 2008

(51) Int. Cl.
*B60Q 1/26* (2006.01)

(52) U.S. Cl. ..... 362/494; 362/516; 362/519; 340/425.5; 340/463; 340/468

(58) Field of Classification Search ............... 362/494, 362/516–519, 511, 514, 521, 641, 346; 340/463, 340/468, 425.5, 815.4, 815.45; 359/839, 359/841–844
See application file for complete search history.

(56) References Cited

U.S. PATENT DOCUMENTS

| | | | |
|---|---|---|---|
| 5,785,418 A * | 7/1998 | Hochstein | 362/373 |
| 6,918,685 B2 * | 7/2005 | Bukosky et al. | 362/301 |
| 7,327,321 B2 * | 2/2008 | Todd et al. | 343/711 |
| 2005/0134953 A1 * | 6/2005 | Mathieu et al. | 359/265 |
| 2006/0012990 A1 * | 1/2006 | Walser et al. | 362/235 |

* cited by examiner

*Primary Examiner* — John Anthony Ward
*Assistant Examiner* — Robert May
(74) *Attorney, Agent, or Firm* — Brian G. Gilpin; Andrew C. Landsman; Godfrey & Kahn, S.C.

(57) ABSTRACT

A signaling assembly for use on an overland vehicle is shown and described, and which includes an exterior mirror housing defining an internal cavity, and which is mounted on a side of the overland vehicle; a semitransparent mirror having forward and rearward facing surfaces, and which is mounted on the mirror housing; a focusing optic mounted in the exterior mirror housing and juxtaposed relative to the rearward facing surface of the semitransparent mirror; and an emitter of visible light mounted in the internal cavity of the exterior mirror housing and juxtaposed relative to the focusing optic, and which further, when energized, emits visible light which passes through the semitransparent mirror, and which can be seen at an angle which is about 60 degrees relative to the side of the overland vehicle.

28 Claims, 2 Drawing Sheets

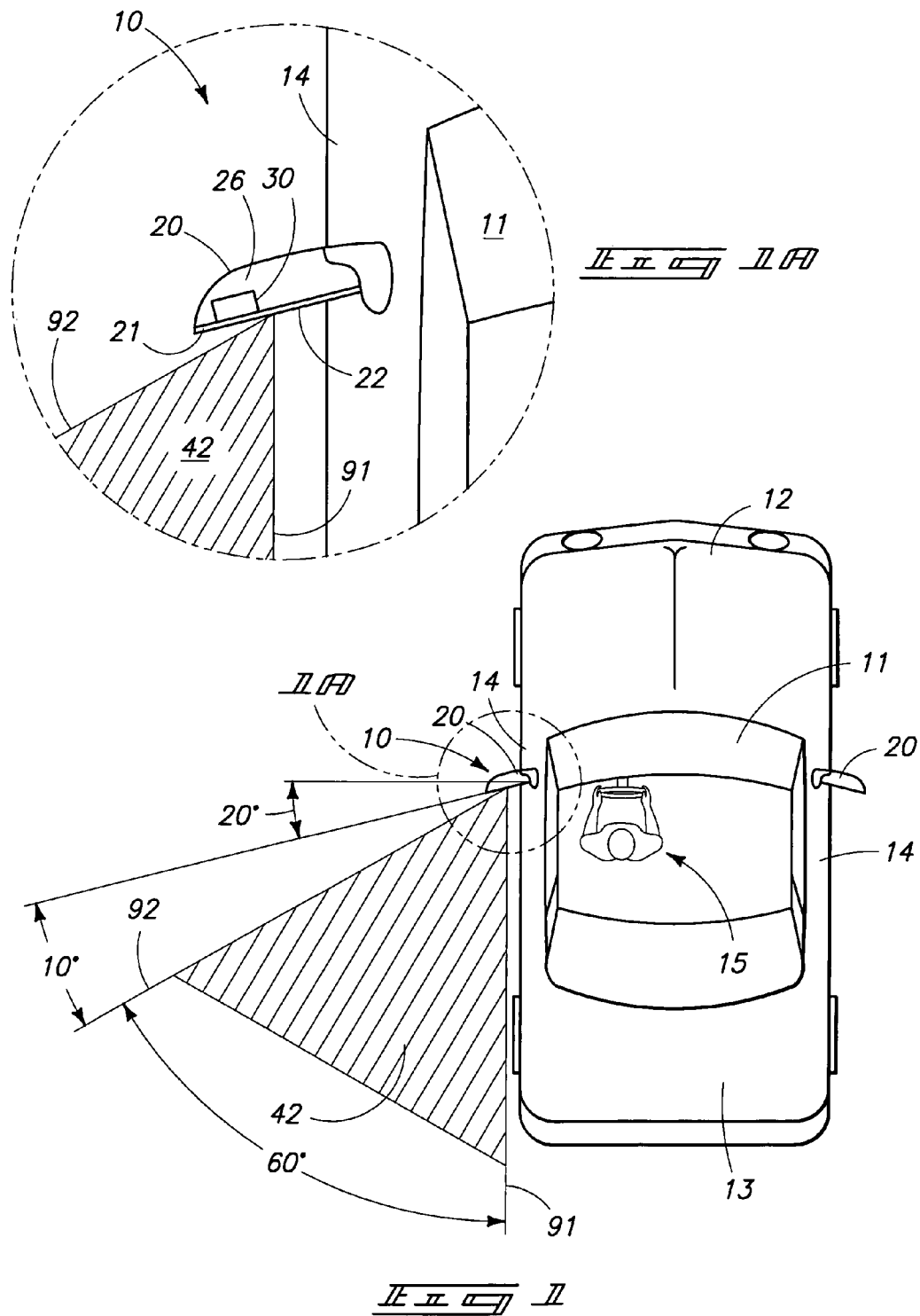

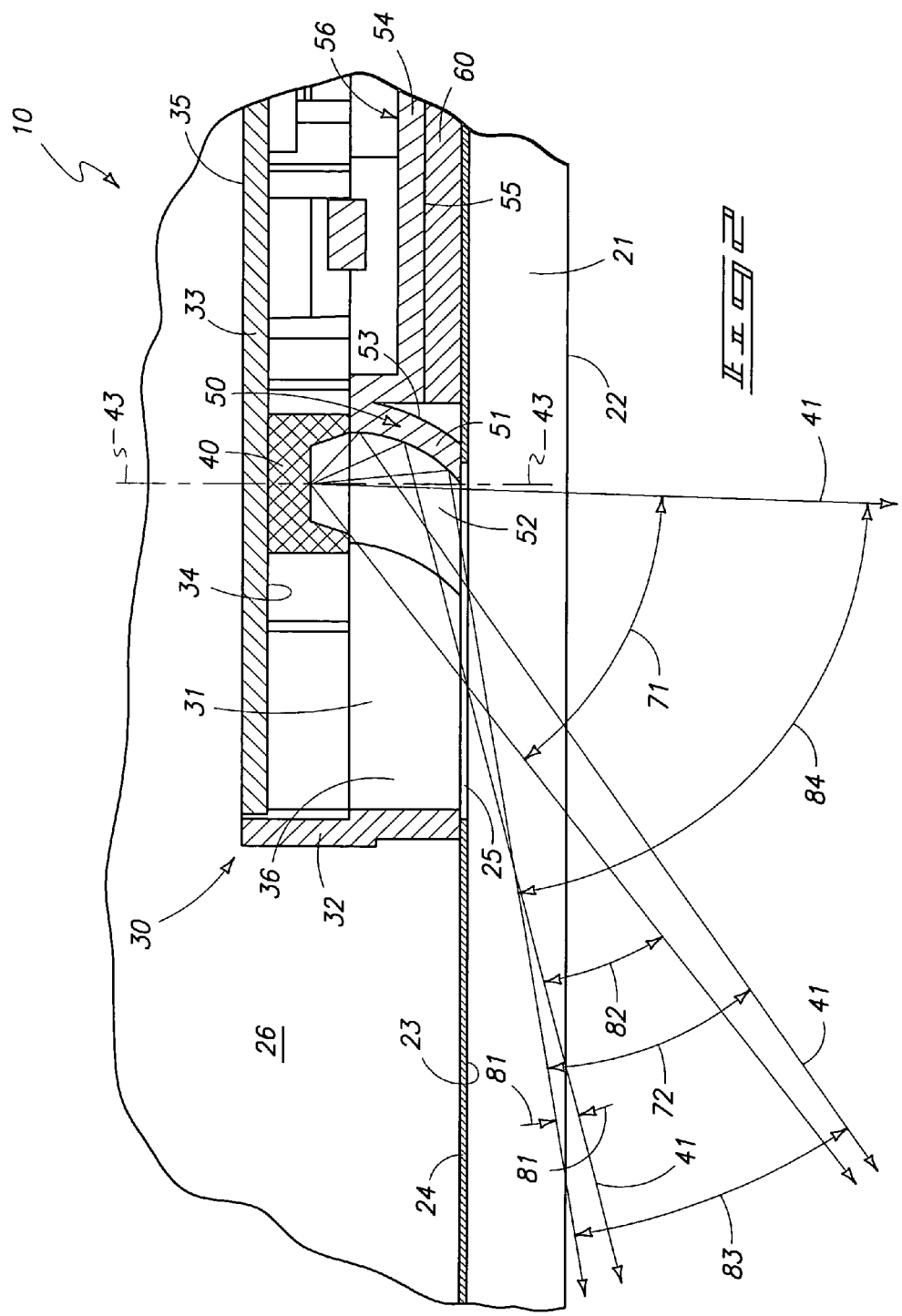

SIGNALING ASSEMBLY

TECHNICAL FIELD

The present invention relates to a signaling assembly for use on overland vehicles and the like, and more specifically to a signaling assembly having a simplified design and which further emits light which can be seen at shallow angles relative to the forward facing surface thereof.

BACKGROUND OF THE INVENTION

The inventor, and the assignee of the present application have endeavored, through the years, to develop a wide variety of different signaling assemblies which may be utilized on overland vehicles of assorted designs, and which are effective to provide a visual signal which indicates to adjoining vehicles that the overland vehicle is ready to change lanes, brake, or otherwise engage in maneuvers which might effect the adjoining vehicle.

In addition to the foregoing, many of the prior art devices which have been developed achieve the benefits described above, as well as additionally providing auxiliary lighting which can be used by an operator during periods of darkness to light the region adjacent to the vehicle. These devices have found wide acceptance and are now used on many automotive platforms which are sold in the U.S. domestic market.

For automobiles that are sold in the European and Japanese markets, the laws of these regions or nations require that only three lights be present along the side of an overland vehicle. This requirement is typically met by the front and rear signaling lights which are typically mounted on the opposite ends of the overland vehicle, and a single side-marker light positioned therebetween. Consequently, for vehicles sold in the European and Japanese markets, a signaling assembly such as what has been disclosed in the prior art cannot be legally mounted on such vehicles unless it is capable of replacing one of the three lights. The logical light which must be replaced is the side-marker. In the Japanese and European markets, the prevailing legal regulations require that a side marker light used on such overland vehicles must be able to emit at least about 0.6 candelas of light and be able to be seen at an angle of at least about 60 degrees away from the side of the overland vehicle.

Another aspect of the present invention relates to a signaling assembly for use on an overland vehicle which includes a mirror housing which is mounted on an overland vehicle, and which defines an internal cavity; a semitransparent mirror mounted on the mirror housing and which has a forward facing, and an opposite, rearward facing surface, and wherein a reflective coating is applied to the rearward facing surface of the semitransparent mirror, and wherein a portion of the reflective coating is removed to define an aperture which allows visible light to pass therethrough; a signaling housing defining a second internal cavity and which is positioned in juxtaposed relation relative to the rearwardly facing surface of the semitransparent mirror, and wherein the signaling housing defines an aperture which is substantially coaxially aligned relative to the aperture defined in the reflective coating and which allows for the passage of visible light therethrough; a circuit board mounted on the signaling housing and which has a first surface, and an opposite second surface, and wherein the circuit board is disposed in spaced relation relative to the rearwardly facing surface of the semitransparent mirror; an emitter of visible light which is electrically coupled to the first surface of the circuit board and positioned within the second internal cavity as defined by the signaling housing, and which, when energized by the circuit board, emits visible light which passes from the second internal cavity of the signaling housing and through the aperture defined by the reflective coating so as to be passed by the semitransparent mirror; and a focusing optic made integral with the signaling housing and which is further positioned in partially occluding relation relative to the aperture defined by the signaling housing, and wherein the focusing optic reflects, at least in part, the emitted visible light provided by the emitter such that the emitted and reflected light may pass through the aperture defined in the reflective coating of the semitransparent mirror and be viewed at an angle which is about 10 degrees relative to the forward facing surface thereof.

Conventional assemblies utilized heretofore have not been useful for this purpose. Attempts to modify such assemblies have resulted in assemblies having very wide width dimensions which are not useful in mirror housing enclosures where the amount of internal space available for such assemblies is extremely limited.

Therefore, a signaling assembly which avoids the shortcomings attendant with the prior art teachings utilized heretofore is the subject matter of the present application.

SUMMARY OF THE INVENTION

A first aspect of the present invention relates to a signaling assembly for use on an overland vehicle which includes an exterior mirror housing defining an internal cavity, and which is mounted on a side of the overland vehicle; a semitransparent mirror having forward and rearward facing surfaces and which is mounted on the mirror housing; a focusing optic mounted in the exterior mirror housing and juxtaposed relative to the rearward facing surface of the semitransparent mirror; and an emitter of visible light mounted in the internal cavity of the exterior mirror housing and juxtaposed relative to the focusing optic, and which further, when energized, emits visible light which passes through the semitransparent mirror and which can be seen at an angle which is about 60 degrees relative to the side of the overland vehicle.

Another aspect of the present invention relates to a signaling assembly for use on an overland vehicle which includes a mirror housing which is mounted on an overland vehicle, and which defines an internal cavity; a semitransparent mirror mounted on the mirror housing and which has a forward facing, and an opposite, rearward facing surface, and wherein a reflective coating is applied to the rearward facing surface of the semitransparent mirror, and wherein a portion of the reflective coating is removed to define an aperture which allows visible light to pass therethrough; a signaling housing defining an internal cavity and which is positioned in juxtaposed relation relative to the rearwardly facing surface of the semitransparent mirror, and wherein the signaling housing defines an aperture which is substantially coaxially aligned relative to the aperture defined in the reflective coating and which allows for the passage of visible light therethrough; a circuit board mounted on the signaling housing and which has a first surface, and an opposite second surface, and wherein the circuit board is disposed in spaced relation relative to the rearwardly facing surface of the semitransparent mirror; an emitter of visible light which is electrically coupled to the first surface of the circuit board and positioned within the cavity as defined by the signaling housing, and which, when energized by the circuit board, emits visible light which passes from the internal cavity of the signaling housing and through the aperture defined by the reflective coating so as to be passed by the semitransparent mirror; and a focusing optic made integral with the signaling housing and which is further positioned in partially occluding relation relative to the aperture defined by the signaling housing, and wherein the focusing optic reflects, at least in part, the emitted visible light provided by the emitter such that the emitted and reflected light may pass through the aperture defined in the reflective coating of the semitransparent mirror and be viewed at an angle which is about 10 degrees relative to the forward facing surface thereof.

Another aspect of the present invention relates to a signaling assembly for use on an overland vehicle which includes an exterior mirror housing defining an internal cavity, and which is mounted on a side of the overland vehicle; a semitransparent mirror having forward and rearward facing surfaces and which is mounted on the mirror housing; a focusing optic mounted in the exterior mirror housing and juxtaposed relative to the rearward facing surface of the semitransparent mirror; and an emitter of visible light mounted in the internal cavity of the mirror housing and juxtaposed relative to the focusing optic, and which further, when energized, emits visible light having a first portion which passes directly through the semitransparent mirror, and which is not acted upon by the focusing optic, and a second portion which is reflected and redirected by the focusing optic and which can be seen at an angle which is about 60 degrees relative to the side of the overland vehicle.

Still another aspect of the present invention relates to a signaling assembly for use on an overland vehicle which includes a mirror housing which is mounted on an overland vehicle, and which defines an internal cavity; a semitransparent mirror mounted on the mirror housing and which has a forward facing, and an opposite, rearward facing surface, and wherein a reflective coating is applied to the rearward facing surface of the semitransparent mirror, and wherein a portion of the reflective coating is removed to define an aperture which allows visible light to pass therethrough, and wherein the semitransparent mirror has a maximum degree of light transmissivity when the emitted visible light is located at substantially 90 degrees relative to the rearwardly facing surface of the semitransparent mirror, and has a decreasing degree of transmissivity as the angle of the emitted visible light becomes less that 90 degrees relative to the rearward facing surface of the semitransparent mirror; a signaling housing defining a second internal cavity and which is positioned in juxtaposed relation relative to the rearwardly facing surface of the semitransparent mirror, and wherein the signaling housing defines an aperture which is substantially coaxially aligned relative to the aperture defined in the reflective coating and which allows for the passage of visible light therethrough; a circuit board mounted on the signaling housing and which has a first surface, and an opposite second surface, and wherein the circuit board is disposed in spaced relation relative to the rearwardly facing surface of the semitransparent mirror; an emitter of visible light which is electrically coupled to the first surface of the circuit board and which is positioned within the second internal cavity as defined by the signaling housing, and which further, when energized by the circuit board, emits visible light which passes from the second internal cavity of the signaling housing and through the aperture defined by the reflective coating so as to be passed by the semitransparent mirror, and wherein the emitted visible light includes a first portion and a second portion which are directed along paths of travel which overlap; and a focusing optic made integral with the signaling housing and which is further positioned in partially occluding relation relative to the aperture defined by the reflective coating, and wherein the first portion of the emitted visible light passes directly through the semitransparent mirror and is not acted upon by the focusing optic, and the second portion of the emitted visible light is reflected and redirected by the focusing optic and which can be seen at an angle which is about 60 degrees relative to the side of the overland vehicle, and wherein the focusing optic collimates, at least in part, the second portion of the emitted visible light so as to compensate for the decreasing light transmissivity of the semitransparent mirror at emitted visible light angles which are less than about 90 degrees relative to the rearwardly facing surface of the semitransparent mirror.

Yet another aspect of the present invention relates to a signaling assembly for use on an overland vehicle which includes a semitransparent mirror having a forward and a rearward facing surface, and which is mounted on the overland vehicle; an emitter of visible light positioned in spaced, substantially normal relation relative to the rearward facing surface of the semitransparent mirror, and which emits visible light which is passed by the semitransparent mirror, and wherein the semitransparent mirror has a maximum degree of transmissivity when the visible light emitted by the emitter is oriented substantially perpendicular relative to the rearward facing surface of the semitransparent mirror, and a decreasing degree of transmissivity when the visible light emitted by the emitter is oriented less than perpendicular relative to the rearward facing surface of the semitransparent mirror; and a focusing optic positioned therebetween the rearward facing surface of the semitransparent mirror, and the emitter of visible light, and which reflects the emitted visible light through the semitransparent mirror to form a resulting signaling light beam which is substantially uniform in intensity when viewed from a first position which is substantially perpendicular relative to the forward facing surface of the semitransparent mirror, and parallel relative to a side of the overland vehicle, to a second position which is about 10 degrees from the forward facing surface of the semitransparent mirror, and 60 degrees from the side of the overland vehicle.

These and other aspects of the present invention will be described in greater detail hereinafter.

BRIEF DESCRIPTION OF THE DRAWINGS

Preferred embodiments of the invention are described below with reference to the following accompanying drawings.

FIG. 1 is a greatly simplified, schematic view of a signaling assembly of the present invention and which is deployed on an overland vehicle of conventional design.

FIG. 2 is a transverse, vertical sectional view of the signaling assembly of the present invention and showing the light emitted from the same assembly.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A signaling assembly of the present invention is generally indicated by the numeral 10 is best understood by a study of FIGS. 1, 1A, and 2, respectively. As seen therein, the signaling assembly 10 of the present invention is mounted on an overland vehicle of conventional design 11 which has a forward end 12; a rearward end 13; and opposite sides 14 which extend between the forward and rearward ends 12 and 13. Still further, the overland vehicle defines an operator's position 15, and the signaling assembly 10 is mounted on the side 14 of the overland vehicle so as to provide a visual signal which can be seen from positions which are laterally and rearwardly disposed relative to the intended forward direction of travel of the overland vehicle 11, and from the operator's position 15. As should be understood, the signaling assembly 10 is mounted within the internal cavity 26 of a mirror housing 20 of traditional design. Moveably mounted on the mirror housing 20 is a semitransparent mirror which is generally indicated by the numeral 21. The semitransparent mirror has a forward facing surface 22, and an opposite rearward facing surface 23. As seen in FIG. 2, a highly reflective layer of material 24 is deposited on the rearward facing surface 23 and renders the semitransparent mirror reflective. A portion of the reflective layer 24 is removed thereby defining an aperture 25. Visible light passes through the aperture 25 in order to provide a visual signal as will be described in greater detail, hereinafter. As should be understood, and while the semitransparent mirror is shown as having a reflective layer 24 deposited on the rearward facing surface 23, it is always possible that a semitransparent mirror might be employed and wherein the reflective layer 24 is deposited on the forward facing surface 22. Still further, other semitransparent mirrors may be substituted in place of same. Such mirrors include the dichroic mirrors previously described in many of the earlier patents which have been assigned to the Assignee of record of the present application.

As see by reference to FIG. 2, the signaling assembly 10 is mounted within the internal cavity 26 as defined by the mirror housing 20. As should be understood, and depending upon the method utilized to deposit the reflective layer 24, it will be appreciated that the reflective layer 24 may be substantially opaque thereby preventing visible light from passing therethrough, except when an aperture 25 is formed therein. Still further, in other forms of the invention, and where, perhaps, a dichroic mirror is employed, an opaque masking layer may be deposited on the rearward facing surface. In that arrangement, an aperture may be formed in the opaque masking layer to allow for the passage of visible light therethrough. Still referring to FIG. 2, and in some applications where the reflective layer 24 is particularly thin, and where visible light may, pass, to some degree, through the thin reflective layer, it may be advisable to employ an opaque masking layer which defines an aperture, and through which visible light may pass. The opaque masking layer may comprise a mirror heater, not shown.

Positioned within the internal cavity 26 of the mirror housing 20 is a signaling housing which is generally indicated by the numeral 30. The signaling housing 30 defines a second internal cavity which is generally indicated by the numeral 31. The signaling housing 30 is positioned in rested relation thereagainst the rearward facing surface 23 of the semitransparent mirror 21. As seen in FIG. 2, the signaling housing 30 is defined by a sidewall 32, and wherein the sidewall rests, at least in part, against the reward facing surface 23 of the semitransparent mirror. The sidewall defines an aperture 36 which is substantially aligned relative to the aperture 25 which is formed in the reflective layer 24. As seen in FIG. 2, a circuit board 33 is mounted on the signaling housing 30. The circuit board 33 has a first or forward facing surface 34 and an opposite or second surface 35. The circuit board 33 is disposed in spaced relation relative to the rearward facing surface 23 of the semitransparent mirror 21. As illustrated in FIG. 2, the second or rearward facing surface of the circuit board 33 is exposed, at least in part, to the internal cavity 26 of the exterior mirror housing 20. The exposed portion of the second surface of the circuit board facilitates the dissipation of at least some of the heat energy generated by the energized emitter of visible light 40, as well as other electrical components which are mounted on the forward facing surface 34 of the circuit board 33. As seen in FIG. 2, the circuit board 33 is operable to energize an emitter of visible light 40 in order to produce visible light 41 which is passed by the semitransparent mirror 21 and which can be seen at an angle which is about 60 degrees relative to the side 14 of the overland vehicle, and which is indicated by the numeral 42 in FIG. 1. The emitter has a longitudinally disposed axis which is labeled by the numeral 43.

Referring still to FIG. 2, it will be seen that the signaling assembly 10 of the present invention includes a focusing optic or reflector 50 and which is mounted in the exterior mirror housing 20, and which is further juxtaposed relative to the rearward facing surface 23 of the semitransparent mirror 21. The focusing optic 50 is operable to reflect at least some of the emitted visible light 41 which is generated by the emitter of visible light 40 such that the emitted visible light can pass through the semitransparent mirror 21 and can be seen at an angle 42 which is about 60 degrees relative to the side 14 of the overland vehicle 11. As illustrated in FIG. 2, it will be understood that the focusing optic or reflector 50 is made integral with the signaling housing 30, and partially occludes the aperture 36, thereof. Still further, the focusing optic has a main body 51 which is positioned in partially occluding relation relative to the aperture 25 which is formed in the reflective layer 24. The main body 51 of the focusing optic or reflector 50 has a curved highly reflective forward facing surface 52 which is operable to reflect at least some of the emitted visible light 41, so that the reflected visible light 41 may pass through the aperture 25 defined by the reflective coating 24 of the semitransparent mirror 21, and be viewed at an angle which is about 10 degrees relative to the forward facing surface 22 of the semitransparent mirror 21. Still further, the curvature of the main body 51 is chosen so as to provide a degree of collimation of the emitted and reflected light 41 and the resulting signaling light beam as will be described below, and which is substantially uniform in intensity when viewed from a first position which is substantially parallel relative to the side 14 of the overland vehicle 11, to a second position which is about 10 degrees from the forward facing surface of the semitransparent mirror and 60 degrees from the side of the overland vehicle. In the arrangement as seen, the curvature which is chosen focuses increasing amounts of emitted visible light 41 at the emitted visible light angles relative to the forward facing surface of the semitransparent mirror and which lie in a range of about 5 to about 22 degrees. The main body 51 is further operable to collimate, at least in part, a portion of the emitted visible light 41 so as to compensate for decreasing light transmissivity of the semitransparent mirror at emitted visible light angles which are less than about 90 degrees relative to the rearwardly facing surface 23 of the semitransparent mirror 20. The main body 51 of the focusing optic 50 further includes a rearwardly facing surface 53. The main body 51 is mounted in reflecting relation relative to the emitter of visible light 40 by means of a support member 54 which is affixed to the main body 51. The support member 54, which is affixed to the signaling housing 30, has a forward facing surface 55, and an opposite, rearward facing surface 56. As will be appreciated from the drawings, the signaling housing 30 is mounted on the rearward facing surface 23 of the semitransparent mirror 21 by means of an adhesive layer 60. The adhesive layer 60 is positioned therebetween the rearward facing surface 23 of the semitransparent mirror 21, and the forward facing surface 55 of the support member 54. It will be further seen by reference to FIG. 2 that the focusing optic 50 is positioned, at least in part, in covering relation relative to the longitudinally disposed axis 43 of the emitter of visible light 40.

Referring still to FIG. 2, it will be seen that the emitter of visible light 40 emits visible light 41 having a first portion 71 which passes directly through the semitransparent mirror 21, and which is not acted upon by the focusing optic 50; and a second portion 72 which is reflected and redirected by the focusing optic 50, and which can be seen at an angle 42 which is about 60 degrees relative to the side 14 of the overland vehicle 11. More specifically, the first and second portions 71 and 72 of the emitted visible light 41 can be seen at an angle which lies in a range of about 0 degrees to about 60 degrees relative to the side of the overland vehicle 42. As earlier noted, the emitted visible light 41 can be seen at an angle which is about 10 degrees relative to the forward facing surface 22 of the semitransparent mirror 21. In the arrangement as seen in FIG. 2, the emitter 40 of visible light 41 produces a sufficient amount of light 41 so that at least about 0.6 candelas of visible light can be viewed from a position which is laterally and rearwardly located relative to the overland vehicle 11. Still further, as will be recognized by a study of FIG. 2, the first and second portions 71 and 72 of the emitted visible light 41 are directed along paths of travel which cross each other, and wherein the focusing optic 50 collimates, at least in part, the second portion 72 of the emitted visible light 41. As will be appreciated from a study of FIG. 2, the semitransparent mirror 21 has a maximum degree of light transmissivity when the emitted visible light 41 is located at substantially 90 degrees relative to the rearwardly facing surface 23 of the semitransparent mirror 21; and further has a decreasing degree of transmissivity as the angle of the emitted visible light 41 becomes less than 90 degrees relative to the rearward facing surface 23 of the semitransparent mirror 21. The focusing optic 50, as noted above, collimates, at least in part, the second portion 72 of the emitted visible light 41 so as to compensate for the decreasing light transmissivity of the semitransparent mirror at emitted visible light angles which are less than 90 degrees relative to the rearwardly facing surface 23 of the semitransparent mirror 21.

Referring still to FIG. 2, it will be seen that the second portion 72 of the emitted visible light 41 is defined by a first beam 81. The emitted visible light 41 is reflected and redirected by the focusing optic 50 whereby the first beam 81 is reflected by the focusing optic so as to be at angle close to the forward facing surface 22 of the semitransparent mirror 21. Further, the second portion 72 is defined by a second beam 82 which is reflected by the focusing optic 50 so as to be at an angle further away from the forward facing surface of the semitransparent mirror 21 than the first beam 81. As should be appreciated from the discussion which has taken place in this application, the first beam 81 is collimated by the focusing optic to a greater degree than the second beam 82.

As seen in FIG. 2, the first and second beams 81 and 82 are principally oriented so as to travel along paths of travel which cross each other and form a composite light beam generally indicated by the numeral 83. The composite light beam 83 formed of the first and second beams 81 and 82 further crosses the path of travel of the first portion 71 of the emitted visible light 41 so as to form a resulting light beam 84 which is substantially uniform in intensity when viewed from a position which is substantially perpendicular relative to the forward facing surface 22 of the semitransparent mirror 21, to a second position which is about 10 degrees removed from the forward facing surface 22 of same.

Therefore, the resulting light beam 84 which is substantially uniform in intensity can be seen from a first position 91 which is substantially parallel relative to a side of the overland vehicle 11; to a second position 92 which is about 10 degrees from the forward facing surface of the semitransparent mirror and 60 degrees from the side of the overland vehicle 11. As seen by reference to FIG. 2, the focusing optic 50 focuses increasingly collimated amounts of emitted light at the emitted shallow visible light angles relative to the forward facing surface 22 of the semitransparent mirror 21 and which lie in a range of about 5 to about 22 degrees. Still further, the focusing optic 50 focus a decreasing amount of emitted visible light at the emitted visible light angles relative to the forward facing surface of the semitransparent mirror and which lie in a range of about 12 to about 51 degrees. Still further, the focusing optic 51 does not reflect some of the emitted visible light 41 which lies in a range of about 33 to about 95 degrees relative to the forward facing surface of the semitransparent mirror 21.

Operation

The operation of the described embodiment of the present invention is believed to be readily apparent and is briefly summarized at this point.

In its broadest aspect, the present invention relates to a signaling assembly 10 for use on an overland vehicle 11, and which includes an exterior mirror housing 20 defining an internal cavity 26, and which is mounted on a side 14 of the overland vehicle. The assembly 10 further includes a semitransparent mirror 21 having forward and rearward facing surfaces 22 and 23, respectively, and which is mounted on the mirror housing. Still further, the assembly 10 includes a focusing optic 50 mounted in the exterior mirror housing and juxtaposed relative to the rearward facing surface 23 of the semitransparent mirror. The assembly further includes an emitter of visible light 40 mounted in the internal cavity 26 of the exterior mirror housing 20 and juxtaposed relative to the focusing optic, and which further, when energized, emits visible light 41 which passes through the semitransparent mirror 21 and which can be seen at an angle 42 which is about 60 degrees relative to the side of the overland vehicle 11.

Another aspect of the present invention relates to a signaling assembly 10 for use on an overland vehicle 11, and which includes a mirror housing 20 which is mounted on an overland vehicle, and which defines an internal cavity 26. The assembly further includes a semitransparent mirror 21 which is mounted on the mirror housing, and which has a forward and an opposite, rearward facing surfaces 22 and 23, respectively, and wherein a reflective coating 24 is applied to the rearward facing surface of the semitransparent mirror, and a portion of the reflective coating is removed to define an aperture 25 which allows visible light 41 to pass therethrough. The signaling assembly 10 further includes a signaling housing 30 defining a second internal cavity 31, and which is positioned in juxtaposed relation relative to the rearward facing surface 23 of the semitransparent mirror 21. The signaling housing defines an aperture 36 which is substantially coaxially aligned relative to the aperture 25 which is defined in the reflective coating 24, and which further allows for the passage of visible light therethrough. A circuit board 33 is provided, and which is mounted on the signaling housing 30, and which has a first surface 34, and an opposite second surface 35. The circuit board 33 is disposed in spaced relation relative to the rearwardly facing surface 23 of the semitransparent mirror 11. An emitter of visible light 40 is provided, and which is electrically coupled to the first surface 34 of the circuit board 33. The emitter of visible light 40 is positioned within the second internal cavity 31 as defined by the signaling housing, and further, when energized by the circuit board 33, emits visible light 41 which passes from the second internal cavity 31 of the signaling housing and through the aperture 25 defined by the reflective coating 24 so as to be passed by the semitransparent mirror 21. Still further, the signaling assembly 10 includes a focusing optic 50 which is made integral with the signaling housing 30, and which is further positioned in partially occluding relation relative to the aperture 36, and which is defined by the signaling housing 30, and the aperture 25 which is defined in the reflective coating 24. The focusing optic 50 reflects, at least in part, the emitted visible light 41 provided by the emitter of visible light 40 such that the emitted and reflected light may pass through the aperture 25, and which is defined by the reflective coating 24 of the semitransparent mirror 21 and be viewed at an angle which is about 10 degrees relative to the forward facing surface thereof.

Another aspect of the present invention relates to a signaling assembly 10 for use on an overland vehicle 11 and which includes an exterior mirror housing 20 defining an internal cavity 26, and which is mounted on a side 14 of the overland vehicle 11. The signaling assembly includes a semitransparent mirror 21 having forward and rearward facing surfaces 22 and 23, respectively, and which is mounted on the mirror housing. A focusing optic 50 is provided, and which is mounted within the exterior mirror housing 20, and which is further juxtaposed relative to the rearward facing surface of the semitransparent mirror 21. Still further, an emitter of visible light 40 is mounted in the internal cavity 26 of the mirror housing 20, and is further juxtaposed relative to the focusing optic 50. The emitter is operable, when energized, to emit visible light 41 having a first portion 71 which passes directly through the semitransparent mirror 21, and which is not acted upon by the focusing optic 50, and a second portion 72 which is reflected and redirected by the focusing optic 50, and which can be seen at an angle which is about 60 degrees relative to the side 14 of the overland vehicle 11. The emitted visible light 41 as provided for in the present invention can be seen in a range of angles of about 0 degrees to about 60 degrees relative to the side of the overland vehicle 11. Still further, the amount of visible light which can be seen is greater than about 0.6 candelas when this visible light is viewed from a position laterally and rearwardly located relative to the overland vehicle 11.

Another aspect of the present invention relates to a signaling assembly 10 for use on an overland vehicle 11 which includes a semitransparent mirror 21 having forward and rearwardly facing surfaces 22 and 23, and which is mounted on the overland vehicle 11. The signaling assembly 10 further includes an emitter 40 of visible light 41 which is positioned in spaced, substantially normal relation relative to the rearwardly facing surface 23 of the semitransparent mirror 21, and which further emits visible light 41 which is passed by the semitransparent mirror. As should be understood, the semitransparent mirror 21 has a maximum degree of transmissivity when the visible light 41 which is emitted by the emitter 40 is oriented substantially perpendicular relative to the rearward facing surface 23 of the semitransparent mirror 21. Still further, the semitransparent mirror has a decreasing degree of transmissivity when the visible light 41 which is emitted by the emitter, is oriented less than perpendicular relative to the rearward facing surface 23 of the semitransparent mirror 21. A focusing optic 50 is positioned therebetween the rearward facing surface 23 of the semitransparent mirror and the emitter of visible light 40. The focusing optic reflects the emitted visible light 41 through the semitransparent mirror to form a resulting signaling light beam 84 which is substantially uniform in intensity when viewed from a first position which is substantially parallel relative to a side 14 of the overland vehicle 11; to a second position which is about 10 degrees displaced from the forward facing surface 22 of the semitransparent mirror 21, and 60 degrees from the side of the overland vehicle 11. As noted earlier, the signaling light beam 84 provided by the present invention 10 has a minimum intensity of 0.6 candelas when viewed from a location which is laterally and rearwardly of the overland vehicle. Still further, the focusing optic 50 has a given curvature, which provides a means by which the emitted visible light 41 can be collimated to various degrees in order to provide a resulting light beam 84 which is substantially uniform in intensity when viewed from positions laterally and rearwardly of the overland vehicle 11.

Therefore, it will be seen that the signaling assembly 10 of the present invention provides a convenient means whereby a signaling assembly can be used on vehicle platforms such as those which might be manufactured in Japan and Europe and whereby the signaling assembly 10 can function as both a signaling assembly as well as a side-marker light thereby complying with the requirements of European and Japanese law.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A signaling assembly for use on an overland vehicle, comprising:
    an exterior mirror housing defining an internal cavity, and which is mounted on a side of the overland vehicle;
    a semitransparent mirror having forward and rearward facing surfaces and which is mounted on the mirror housing;
    a reflector which has a given curvature, and which is mounted in the exterior mirror housing and juxtaposed relative to the rearward facing surface of the semitransparent mirror; and
    an emitter of visible light mounted in the internal cavity of the exterior mirror housing and juxtaposed relative to the reflector, and which further, when energized, emits visible light which is directed to and passes through the semitransparent mirror and which can be seen at an angle which is about 60 degrees relative to the side of the overland vehicle and at an angle which is about 10 degrees relative to the forward facing surface of the semitransparent mirror, and wherein the reflector is disposed in partial, covering relation relative to the emitter of visible light.

2. A signaling assembly as claimed in claim 1, and further comprising:
    an opaque layer attached to the rearward facing surface of the semitransparent mirror, and which defines an aperture through which the visible light passes, and wherein the reflector is mounted, at least in part, within the aperture defined by the opaque layer.

3. A signaling assembly as claimed in claim 1, and wherein a reflective coating is applied to the forward facing surface of the semitransparent mirror, and wherein a portion of the reflective coating is removed to form an aperture through which the visible light passes, and wherein the reflector is mounted, at least in part, within the aperture which is defined by the reflective coating.

4. A signaling assembly as claimed in claim 1, and wherein a reflective coating is applied to the rearward facing surface of the semitransparent mirror, and wherein a portion of the reflective coating is removed to form an aperture through which the visible light passes, and wherein the reflector is mounted, at least in part, within the aperture which is defined by the reflective coating.

5. A signaling assembly as claimed in claim 1, and wherein the emitter emits an amount of visible light so that at least about 0.6 candelas of visible light can be viewed from a position which is laterally and rearwardly located relative to the overland vehicle.

6. A signaling assembly as claimed in claim 1, and further comprising:
a signaling housing positioned within the internal cavity of the exterior mirror housing, and which is positioned in rested relation thereagainst the rearward facing surface of the semitransparent mirror, and wherein the signaling housing defines a second internal cavity; and
a circuit board mounted on the signaling housing, and wherein the circuit board has a first surface, and an opposite second surface, and wherein the emitter of visible light is mounted on the first surface and is located within the second internal cavity as defined by the signaling housing, and is further located in spaced relation relative to the rearward facing surface of the semitransparent mirror, and wherein the reflector is mounted on the signaling housing and located therebetween the rearward facing surface of the semitransparent mirror and the circuit board.

7. A signaling assembly as claimed in claim 6, and wherein the second surface of the circuit board is exposed, at least in part, to the internal cavity of the exterior mirror housing, and wherein the emitter of visible light and the associated circuitry, when energized, emit heat energy, and wherein the exposed portion of the second surface of the circuit board facilitates the dissipation of at least some of the heat energy generated by the energized emitter of visible light and the associated circuitry.

8. A signaling assembly as claimed in claim 7, and wherein the signaling housing defines an aperture through which the visible light produced by the emitter of visible light may pass, and wherein the reflector at least partially occludes the aperture as defined by the signaling housing.

9. A signaling assembly for use on an overland vehicle, comprising:
a mirror housing which is mounted on an overland vehicle, and which defines an internal cavity;
a semitransparent mirror mounted on the mirror housing and which has a forward facing, and an opposite, rearward facing surface, and wherein a reflective coating is applied to the rearward facing surface of the semitransparent mirror, and wherein a portion of the reflective coating is removed to define an aperture which allows visible light to pass therethrough;
a signaling housing defining a second internal cavity and which is positioned in juxtaposed relation relative to the rearwardly facing surface of the semitransparent mirror, and wherein the signaling housing defines an aperture which is substantially coaxially aligned relative to the aperture defined in the reflective coating and which allows for the passage of visible light therethrough;
a circuit board mounted on the signaling housing and which has a first surface, and an opposite second surface, and wherein the circuit board is disposed in spaced relation relative to the rearwardly facing surface of the semitransparent mirror;
an emitter of visible light which is electrically coupled to the first surface of the circuit board and positioned within the second internal cavity as defined by the signaling housing, and which is directed toward the semitransparent mirror, and which, when energized by the circuit board, emits visible light which passes from the second internal cavity of the signaling housing and through the aperture defined by the reflective coating so as to be passed by the semitransparent mirror; and
a reflector made integral with the signaling housing and which is further positioned in partially occluding relation relative to the aperture defined by the signaling housing, and wherein the reflector reflects, at least in part, the emitted visible light provided by the emitter such that the emitted and reflected light may pass through the aperture defined in the reflective coating of the semitransparent mirror and be viewed at an angle which is about 10 degrees relative to the forward facing surface thereof, and can be seen at an angle which is about 60 degrees relative to the side of the overland vehicle.

10. A signaling assembly as claimed in claim 9, and wherein the mirror housing is mounted on the side of the overland vehicle, and wherein the emitted visible light which is passed by the semitransparent mirror can be seen with a minimum intensity of at least about 0.6 candelas.

11. A signaling assembly as claimed in claim 9, and further comprising:
an adhesive layer positioned therebetween the rearwardly facing surface of the semitransparent mirror and the reflector and which operates to secure the signaling housing to the rearward facing surface of the semitransparent mirror.

12. A signaling assembly for use on an overland vehicle, comprising:
an exterior mirror housing defining an internal cavity, and which is mounted on a side of the overland vehicle;
a semitransparent mirror having forward and rearward facing surfaces and which is mounted on the mirror housing;
a reflector mounted in the exterior mirror housing and juxtaposed relative to the rearward facing surface of the semitransparent mirror; and
an emitter of visible light mounted in the internal cavity of the mirror housing, and which is directed toward the semitransparent mirror, and juxtaposed relative to the reflector, and which further has a longitudinally disposed axis, and wherein the reflector is positioned, at least in part, in covering relation relative to the longitudinally disposed axis, and wherein the emitter of visible light, when energized, emits visible light having a first portion which passes directly through the semitransparent mirror, and which is not acted upon by the reflector, and a second portion which is reflected and redirected by the reflector and which can be seen at an angle which is about 60 degrees relative to the side of the overland vehicle and an angle which is about 10 degrees relative to the forward facing surface of the semitransparent mirror.

13. A signaling assembly as claimed in claim 12, and wherein a reflective coating is applied to the rearward facing surface of the semitransparent mirror, and wherein a portion of the reflective coating is removed to form an aperture through which the first and second portions of the emitted visible light may pass, and wherein the reflector is positioned, at least in part, within the aperture which is defined by the reflective coating.

14. A signaling assembly as claimed in claim 12 and wherein the emitter of visible light produces a sufficient amount of light so that at least about 0.6 candelas of visible light can be viewed from a position which is laterally and rearwardly located relative to the overland vehicle.

15. A signaling assembly as claimed in claim 14, and wherein the first and second portions of the emitted light are directed along paths of travel which cross each other, and wherein the reflector collimates, at least in part, the second portion of the emitted visible.

16. A signaling assembly as claimed in claim 14, and wherein the semitransparent mirror has a maximum degree of light transmissivity when the emitted visible light is located at substantially 90 degrees relative to the rearwardly facing surface of the semitransparent mirror, and has a decreasing degree of transmissivity as the angle of the emitted visible light becomes less that 90 degrees relative to the rearward facing surface of the semitransparent mirror, and wherein the reflector collimates, at least in part, the second portion of the emitted visible light so as to compensate for the decreasing light transmissivity of the semitransparent mirror at emitted visible light angles which are less than 90 degrees relative to the rearwardly facing surface of the semitransparent mirror.

17. A signaling assembly as claimed in claim 12, and further comprising:
an adhesive layer positioned therebetween the reflector and the rearward facing surface of the semitransparent mirror, and wherein the adhesive layer secures the reflector on the rearwardly facing surface.

18. A signaling assembly for use on an overland vehicle, comprising:
a mirror housing which is mounted on an overland vehicle, and which defines an internal cavity;
a semitransparent mirror mounted on the mirror housing and which has a forward facing, and an opposite, rearward facing surface, and wherein a reflective coating is applied to the rearward facing surface of the semitransparent mirror, and wherein a portion of the reflective coating is removed to define an aperture which allows visible light to pass therethrough, and wherein the semitransparent mirror has a maximum degree of light transmissivity when the emitted visible light is located at substantially 90 degrees relative to the rearwardly facing surface of the semitransparent mirror, and has a decreasing degree of transmissivity as the angle of the emitted visible light becomes less that 90 degrees relative to the rearward facing surface of the semitransparent mirror;
a signaling housing defining a second internal cavity and which is positioned in juxtaposed relation relative to the rearwardly facing surface of the semitransparent mirror, and wherein the signaling housing defines an aperture which is substantially coaxially aligned relative to the aperture defined in the reflective coating and which allows for the passage of visible light therethrough;
a circuit board mounted on the signaling housing and which has a first surface, and an opposite second surface, and wherein the circuit board is disposed in spaced relation relative to the rearwardly facing surface of the semitransparent mirror;
an emitter of visible light which is electrically coupled to the first surface of the circuit board and which is positioned within the second internal cavity as defined by the signaling housing, and which is directed toward the semitransparent mirror, and which further, when energized by the circuit board, emits visible light which passes from the second internal cavity of the signaling housing and through the aperture defined by the reflective coating so as to be passed by the semitransparent mirror, and wherein the emitted visible light includes a first portion and a second portion which are directed along paths of travel which overlap; and
a reflector made integral with the signaling housing, and which has a given curvature, and which is further positioned in partially occluding relation relative to the aperture defined by the reflective coating, and wherein the first portion of the emitted visible light passes directly through the semitransparent mirror and is not acted upon by the reflector, and the second portion of the emitted visible light is reflected and redirected by the reflector and which can be seen at an angle which is about 60 degrees relative to the side of the overland vehicle or at an angle of 10 degrees relative to the forward facing surface of the semitransparent mirror, and wherein the reflector collimates, at least in part, the second portion of the emitted visible light so as to compensate for the decreasing light transmissivity of the semitransparent mirror at emitted visible light angles which are less than about 90 degrees relative to the rearwardly facing surface of the semitransparent mirror.

19. A signaling assembly as claimed in claim 18, and wherein the second portion of the emitted visible light which is reflected and redirected by the reflector comprises a first beam and a second beam, and wherein the first beam is reflected so as to be at an angle close to the forward facing surface of the semitransparent mirror and the second beam is reflected so as to be at an angle farther away from the forward facing surface of the semitransparent mirror than the first beam, and wherein the first beam is collimated to greater degree than the second beam.

20. A signaling assembly as claimed in claim 19, and wherein the first and second beams are principally oriented so as to travel along paths of travel which cross each other and form a composite light beam, and wherein the composite light beam formed from the first and second beams further crosses the path of travel of the first portion of the emitted visible light to form a resulting light beam which is substantially uniform in intensity when viewed from a position which is substantially perpendicular relative to the forward facing surface to a position which is about 10 degrees removed from the forward facing surface of the semitransparent mirror.

21. A signaling assembly as claimed in claim 18, and further comprising:
an adhesive layer positioned therebetween the reflector and the rearward facing surface of the semitransparent mirror, and wherein the adhesive layer secures the reflector on the rearward facing surface of the semitransparent mirror.

22. A signaling assembly as claimed in claim 18, and which further comprises circuitry mounted on the circuit board and which energizes the emitter of visible light, and wherein the emitter of visible light and the associated circuitry generates heat energy when the emitter is energized by the associated circuitry, and wherein the second surface of the circuit board is oriented relative to the signaling housing so as to facilitate the dissipation of the heat energy generated by the emitter of visible light and the associated circuitry to the internal cavity of the mirror housing.

23. A signaling assembly as claimed in claim 18, and wherein the first portion of the emitted visible light is oriented, at least in part, at a substantially 90 degree angle relative to the rearward facing surface of the semitransparent mirror.

24. A signaling assembly for use on an overland vehicle, comprising:
   a semitransparent mirror having a forward and a rearward facing surface, and which is mounted on the overland vehicle;
   an emitter of visible light positioned in spaced, substantially normal relation relative to the rearward facing surface of the semitransparent mirror, and which emits visible light directed to the semitransparent mirror, and wherein the semitransparent mirror has a maximum degree of transmissivity when the visible light emitted by the emitter is oriented substantially perpendicular relative to the rearward facing surface of the semitransparent mirror, and a decreasing degree of transmissivity when the visible light emitted by the emitter is oriented less than perpendicular relative to the rearward facing surface of the semitransparent mirror; and
   a reflector positioned therebetween the rearward facing surface and the emitter of visible light, and which has a given curvature, and which is disposed in partial, covering relation relative to the emitter of visible light, and which reflects the emitted visible light through the semitransparent mirror to form a resulting signaling light beam which is substantially uniform in intensity when viewed from a first position which is substantially parallel relative to a side of the overland vehicle, to a second position which is about 10 degrees from the forward facing surface of the semitransparent mirror, and 60 degrees from the side of the overland vehicle.

25. A signaling assembly as claimed in claim 24, and wherein the resulting signaling light beam has a minimum intensity of 0.6 candelas when viewed from a position which is laterally and rearwardly located relative to the overland vehicle.

26. A signaling assembly as claimed in claim 24, and wherein the reflector reflects increasing amounts of the emitted visible light at the emitted visible light angles relative to the forward facing surface of the semitransparent mirror, and which lie in a range of about 5 degrees to about 22 degrees.

27. A signaling assembly as claimed in claim 26, and wherein the reflector reflects a decreasing amount of emitted visible light at the emitted visible light angles relative to the forward facing surface of the semitransparent mirror, and which lie in a range of about 12 degrees to about 51 degrees.

28. A signaling assembly as claimed in claim 27, and wherein the reflector does not reflect some of the emitted visible light which lies in a range of about 33 degrees to about 95 degrees relative to the forward facing surface of the semitransparent mirror.

* * * * *